UNITED STATES PATENT OFFICE.

FREIHERR JOSEPH VON MERING, OF HALLE-ON-THE-SAALE, GERMANY.

PROCESS OF MAKING ETHYL MORPHIN.

SPECIFICATION forming part of Letters Patent No. 629,264, dated July 18, 1899.

Application filed July 22, 1898. Serial No. 686,613. (No specimens.)

*To all whom it may concern:*

Be it known that I, FREIHERR JOSEPH VON MERING, professor of medicine, a subject of the German Emperor, and a resident of Halle-on-the-Saale, Germany, have invented certain new and useful Improvements in Methods of Producing Ethyl Morphin; and I do hereby declare the following to be a full, clear, and exact description of the invention, such as will enable others skilled in the art to which it appertains to make and use the same.

It is known that by the action of iodo-ethyl upon an alkaline solution of morphin ethyl morphin can be produced. The yield, however, is absolutely insufficient, as has already been pointed out by Grimaux, the discoverer of ethyl morphin, (see *Comptes Rendus*, Vol. 92, 1881, p. 1142,) seeing that one hundred grams of morphin yield but forty to forty-five grams of ethyl morphin.

In the hope that the production of ethyl morphin by the action of ethyl bromid upon an alkaline solution of morphin would meet with less difficulties I have dissolved morphin in alkali, adding sodium or caustic soda in calculated quantities, and have them added ethyl bromid in calculated quantities. The mixture was subsequently heated for one to two hours at a temperature varying between 80° and 100° centigrade in a digester or upon a water-bath.

In the process it has been found that the formation of ethyl morphin proceeds smoothly and that the output is almost a theoretical one. I wish to mention that by causing propyl bromid to act upon the alkaline solution of morphin propyl morphin is also obtained in an almost theoretical quantity. To obtain morphin ethers, Grimaux has used allyl bromid, (univalent unsaturated,) ethylene bromid, (bivalent saturated,) and epichlorhydrin, (trivalent saturated.) For producing morphin ethers, however, Grimaux has not utilized bromo halogen derivatives of alcohol, derivatives of the paraffin series, (univalent saturated alcohol radicals,) and especially not ethyl bromid. Ethyl bromid has never been used for this purpose, probably owing to the fact that the unsatisfactory result with iodo-ethyl precluded its use. It must be especially stated that according to my experiences I have found that by the action of methyl bromid on an alkaline solution of morphin only twenty-five per cent. of methyl morphin is obtained.

As a suitable manufacturing process, according to which easily from eighty-five to ninety per cent. of ethyl morphin is obtained, the following has been proved:

Example: Three kilograms of morphin plus two hundred and thirty grams of sodium or plus seven hundred grams of sodium ethylate plus thirty to forty kilograms of alcohol and 1.1 kilograms of ethyl bromid are heated for one to two hours upon the water-bath on the return-flow cooler. The reagent mixture after the larger portion of the alcohol has been distilled off is evaporated upon the water-bath until dry. The residue is extracted with ether and filtered. The filtrate after the ether has been volatilized leaves a thick syrup, which very soon crystallizes and consists of ethyl morphin.

I claim as my invention—

A method of producing ethyl morphin by causing ethyl bromid to act upon an alkaline solution of morphin.

In testimony that I claim the foregoing as my invention I have signed my name in presence of two subscribing witnesses.

FREIHERR JOSEPH VON MERING.

Witnesses:
NATHAN ZUNTZ,
HANS THIERFELDER.